(12) United States Patent
Sakai

(10) Patent No.: US 8,891,180 B2
(45) Date of Patent: Nov. 18, 2014

(54) OPTICAL SYSTEM, AND IMAGE PICKUP APPARATUS HAVING THE SAME

(71) Applicant: Canon Kabushiki Kaisha, Tokyo (JP)

(72) Inventor: Hideki Sakai, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/875,786

(22) Filed: May 2, 2013

(65) Prior Publication Data

US 2013/0300913 A1    Nov. 14, 2013

(30) Foreign Application Priority Data

May 10, 2012   (JP) .................................. 2012-108475

(51) Int. Cl.
| | | |
|---|---|---|
| G02B 9/08 | (2006.01) | |
| G02B 13/18 | (2006.01) | |
| G03B 9/06 | (2006.01) | |
| G03B 9/02 | (2006.01) | |
| G02B 15/20 | (2006.01) | |

(52) U.S. Cl.
CPC ........ *G03B 9/06* (2013.01); *G02B 13/18* (2013.01); *G03B 9/02* (2013.01); *G02B 15/20* (2013.01)
USPC .......................................................... 359/738

(58) Field of Classification Search
USPC .......................................... 359/738; 396/507
See application file for complete search history.

(56) References Cited

U.S. PATENT DOCUMENTS

| | | | |
|---|---|---|---|
| 7,023,623 B2 | 4/2006 | Miyatake et al. | |
| 7,830,613 B2 | 11/2010 | Ichikawa | |
| 8,009,343 B2 * | 8/2011 | Gellrich et al. | ............... 359/234 |

FOREIGN PATENT DOCUMENTS

| | | |
|---|---|---|
| JP | 2007-94074 A | 4/2007 |
| JP | 2008-250332 A | 10/2008 |
| JP | 2010-164606 A | 7/2010 |

* cited by examiner

*Primary Examiner* — Joseph P Martinez

(74) *Attorney, Agent, or Firm* — Carter, DeLuca, Farrell & Schmidt, LLP

(57) ABSTRACT

An optical system includes an aperture diaphragm having such a curved surface shape that an aperture part moves in an optical axis direction as an aperture diameter changes. The aperture diaphragm has a convex shape on an object side when an optical system on the object side of the aperture diaphragm has a negative refractive power, and the aperture diaphragm has a convex shape on an image side when the optical system on the object side of the aperture diaphragm has a positive refractive power.

12 Claims, 8 Drawing Sheets

OPTICAL SYSTEM, AND IMAGE PICKUP APPARATUS HAVING THE SAME

BACKGROUND OF THE INVENTION

1. Field of the Invention

The present invention relates to an optical system and an image pickup apparatus having the same. The present invention is suitable, for example, for an image pickup optical system for use with a digital still camera, a video camera, a TV camera, and a surveillance camera, etc.

2. Description of the Related Art

An image pickup optical system used for an image pickup apparatus, such as a digital still camera and a video camera, is demanded for a small overall system and a high optical performance. Many image pickup apparatuses are made thin by retracting each lens unit in an image pickup optical system, in a camera body at the non-image pickup time. For a miniaturization of the retracted image pickup optical system, one known lens barrel has an aperture blade with a curved surface in an aperture diaphragm configured to vary its aperture diameter and located in an optical path. Japanese Patent Laid-Open No. ("JP") 2007-94074 discloses a lens barrel that includes an aperture blade with a concave shape on the image pickup plane side for a concave surface of a front lens and a convex surface of a back lens with respect to the aperture diaphragm in the optical axis direction in the retraction state.

A known four-unit zoom lens has four lens units that includes, in order from the object side to the image side, a first lens unit having a positive refractive power, a second lens unit having a negative refractive power, a third lens unit having a positive refractive power, and a fourth lens unit having a positive refractive power. U.S. Pat. No. 7,830,613 discloses a rear focus type four-unit zoom lens in which each lens unit is moved for zooming, a fourth lens unit is moved so as to correct an image plane fluctuation associated with the magnification variation and to provide focusing.

Another known three-unit zoom lens includes, in order from the object side to the image side, a first lens unit having a negative refractive power, a second lens unit having a positive refractive power, and a third lens unit having a positive refractive power. U.S. Pat. No. 7,023,623 discloses a three-unit zoom lens in which each lens unit is moved for zooming and the third lens unit provides focusing.

When a light quantity incident upon an image plane is restricted in the image pickup optical system by changing an aperture diameter of an aperture diaphragm, it is important to properly shield the light so that an incident light amount can change in a well-balanced manner over the entire image. A ratio of the brightness between the center and the periphery of an image becomes too high and a difference between the brightness and darkness stands out, if the light intensity incident upon the periphery of the image significantly drops when the aperture diameter of the aperture diaphragm is changed. It is thus important to change the aperture diameter of the aperture diaphragm according to a light flux incident upon the aperture diaphragm.

It is difficult to obtain a good image when the axial position of the aperture part of the aperture diaphragm does not change according to the aperture diameter because the best axial position of the aperture part of the aperture diaphragm changes in the image pickup optical system according to the aperture diameter of the aperture diaphragm.

SUMMARY OF THE INVENTION

The present invention provides an optical system and an image pickup apparatus having the same, which can obtain a good image over an entire image when an aperture diameter of an aperture diaphragm.

An optical system according to the present invention includes an aperture diaphragm having such a curved surface shape that an aperture part moves in an optical axis direction as an aperture diameter changes. The aperture diaphragm has a convex shape on an object side when an optical system on the object side of the aperture diaphragm has a negative refractive power, and the aperture diaphragm has a convex shape on an image side when the optical system on the object side of the aperture diaphragm has a positive refractive power.

Further features of the present invention will become apparent from the following description of exemplary embodiments with reference to the attached drawings.

DESCRIPTION OF THE EMBODIMENTS

A description will now be given of an optical system and an image pickup apparatus having the same according to the present invention. The optical system according to the present invention includes an aperture diaphragm having a curved surface shape in which an aperture part is movable in the optical axis direction as the aperture diameter changes. When the optical system arranged on the object side of the aperture diaphragm has a negative refractive power, the aperture diaphragm has a convex shape on the object side. When the optical system arranged on the object side of the aperture diaphragm has a positive refractive power, the aperture diaphragm has a convex shape on the image side.

Figure 1:
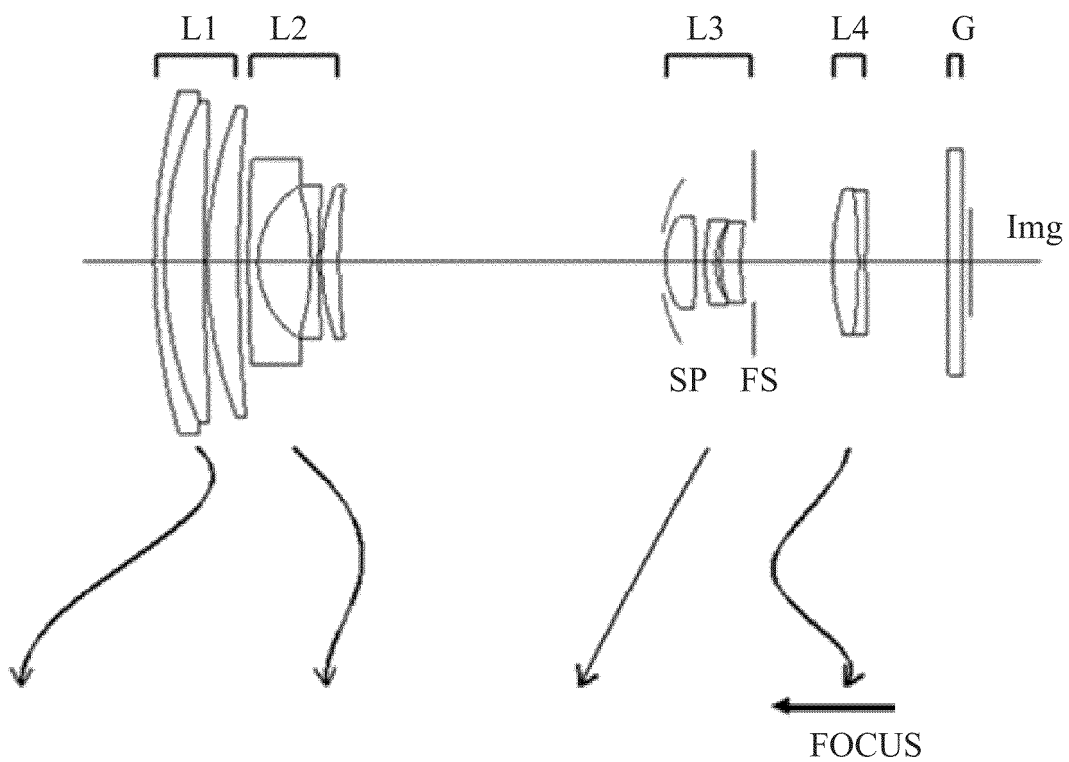
FIG. 1 is an optical sectional view of an optical system according to a first embodiment.
Figure 2A:
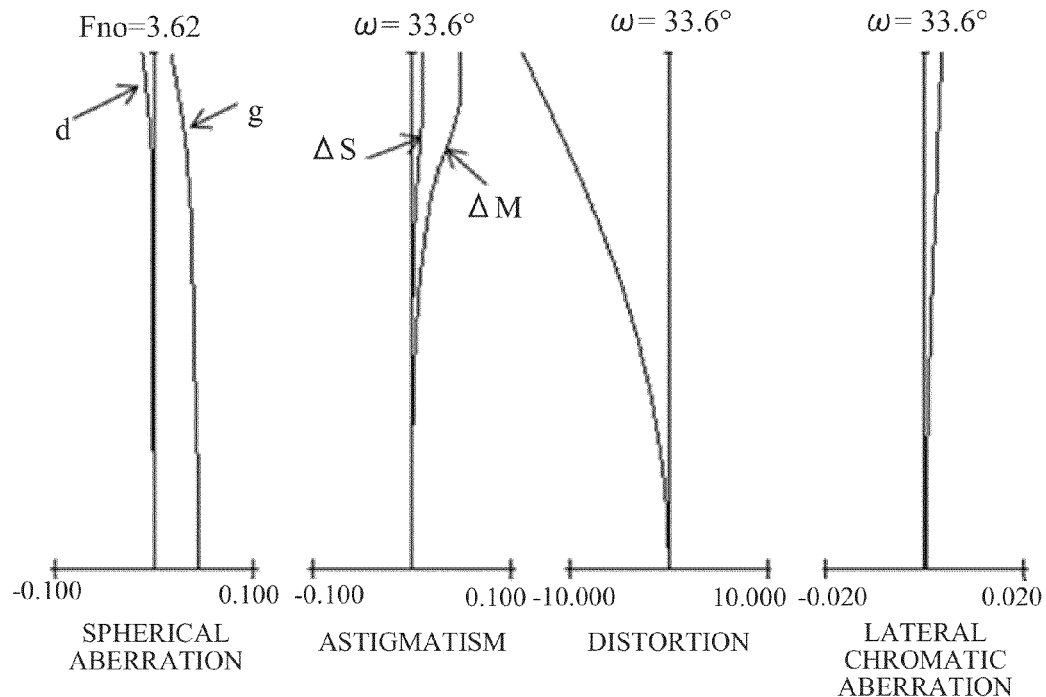
FIGS. 2A and 2B are aberrational diagrams at a wide angle end and a telephoto end of the optical system according to the first embodiment.
Figure 2B:
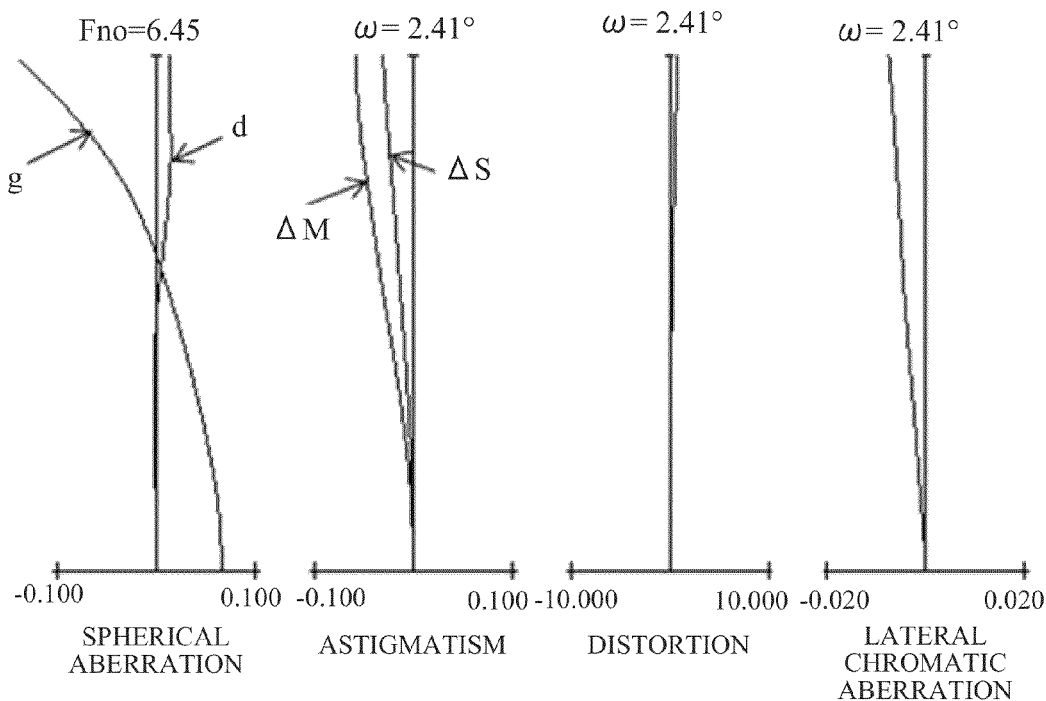

A description will be given of an embodiment when the optical system according to the present invention is applied, for example, to a zoom lens. FIG. 1 is a lens sectional view at a wide angle end (short focal length end) of the zoom lens according to the first embodiment of the present invention. FIGS. 2A and 2B are aberrational diagrams at a wide angle end and a telephoto end (long focal length end) of the zoom lens according to the first embodiment, respectively.

Figure 3:
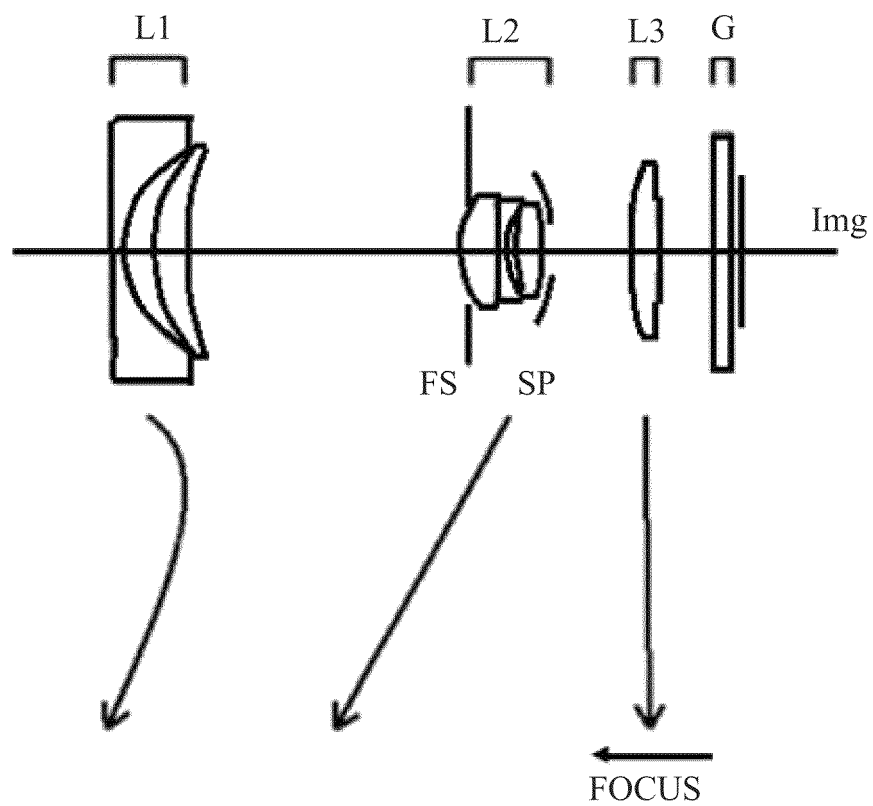
FIG. 3 is an optical sectional view of an optical system according to a second embodiment.
Figure 4A:
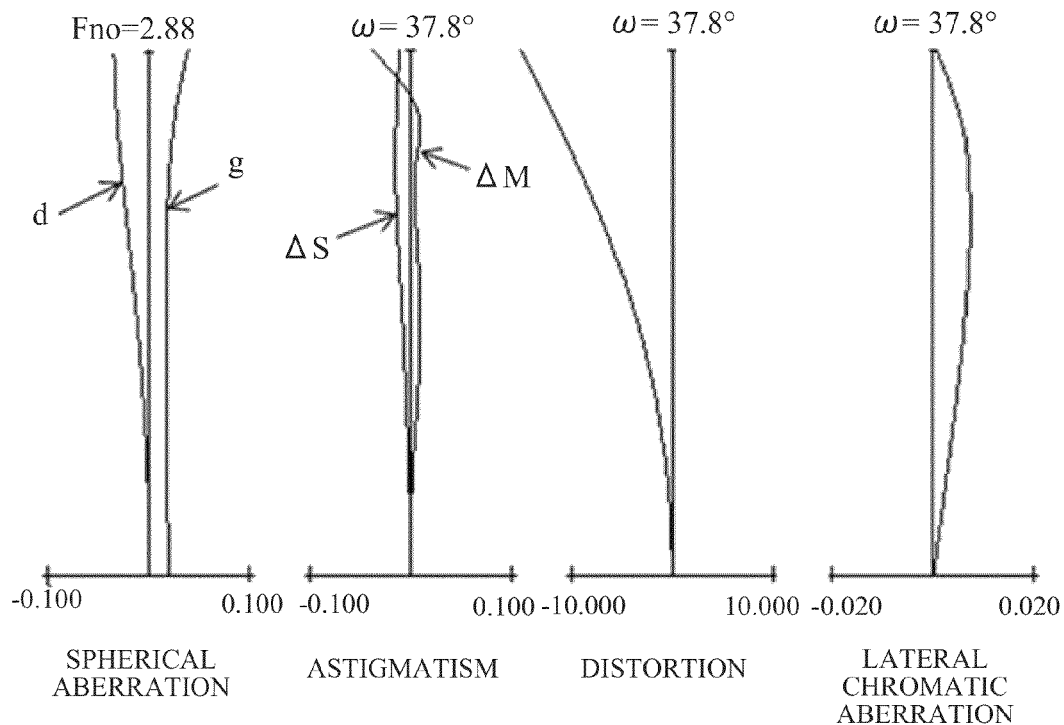
FIGS. 4A and 4B are aberrational diagrams at a wide angle end and a telephoto end of the optical system according to the second embodiment.
Figure 4B:
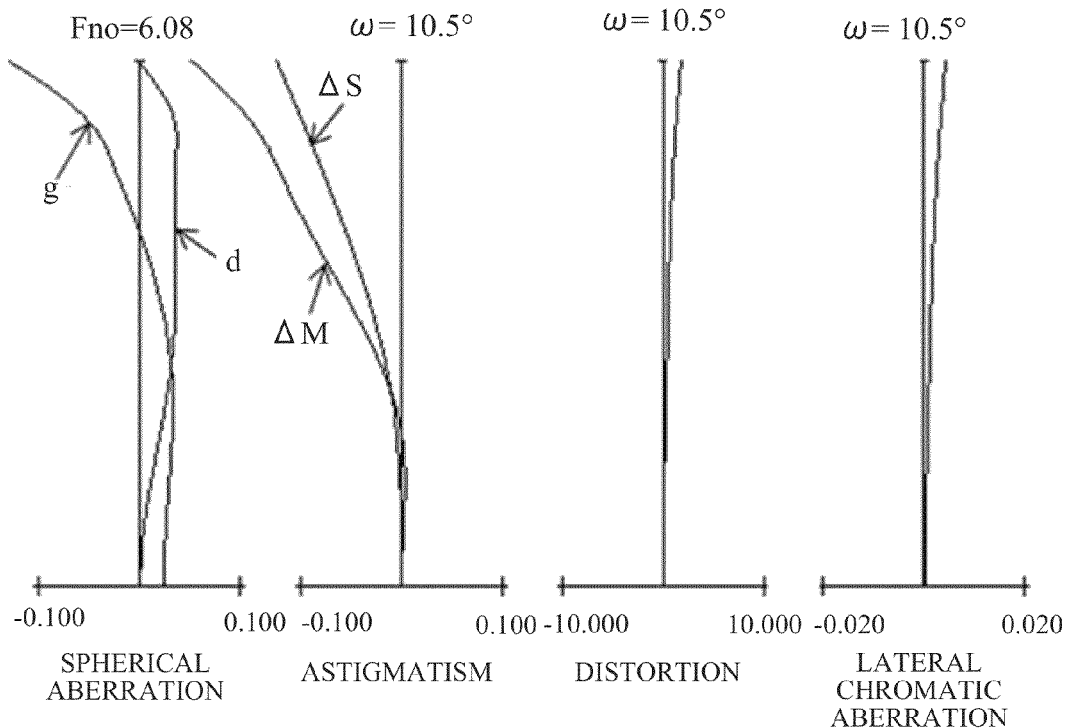
Figure 5:
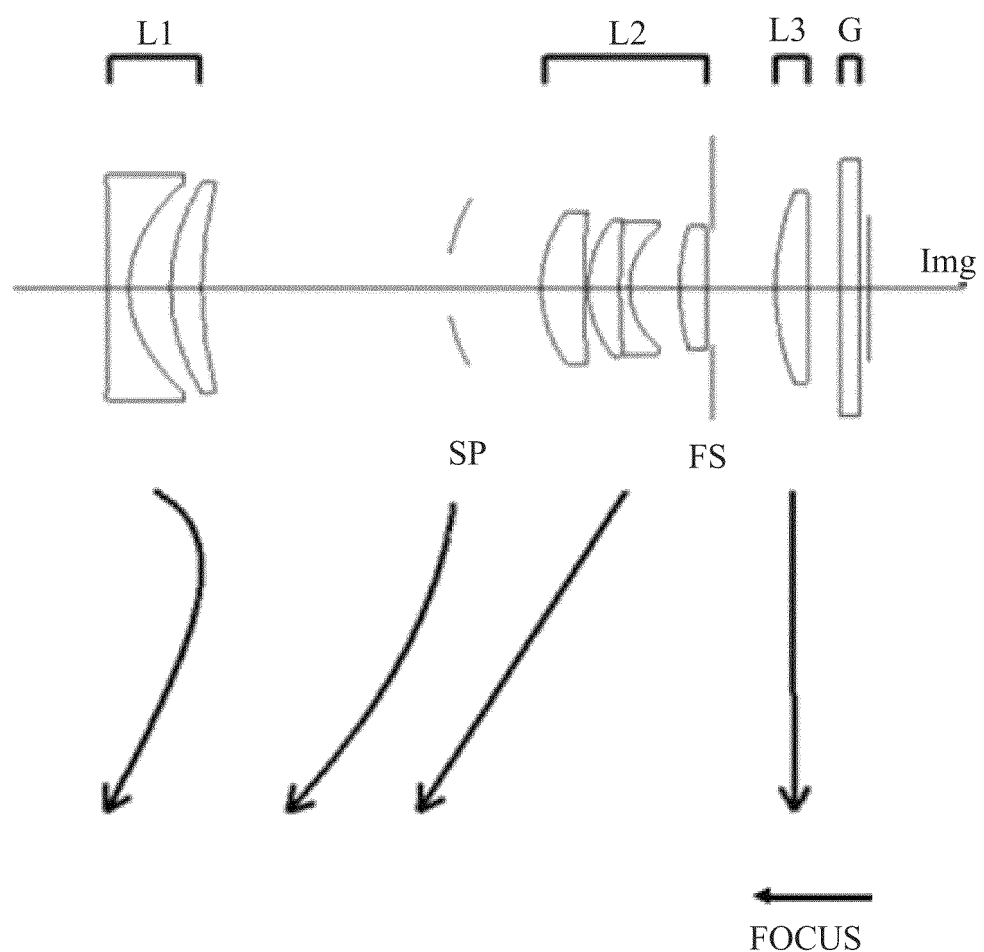
FIG. 5 is an optical sectional view of an optical system according to a third embodiment.
Figure 6A:
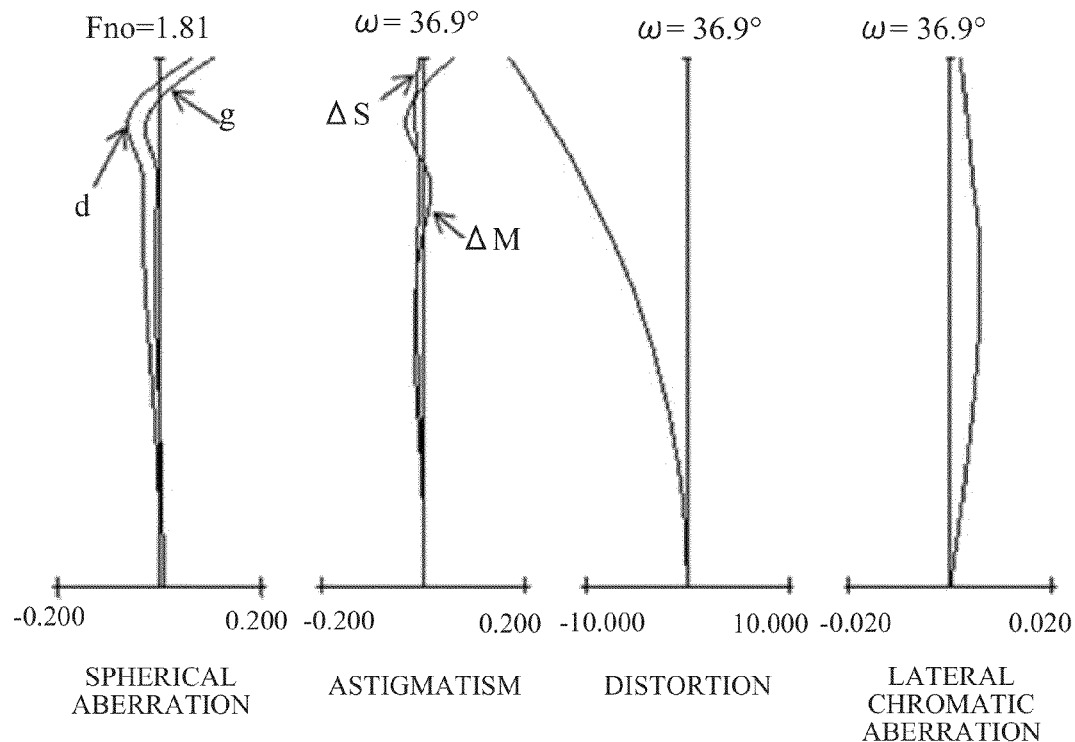
FIGS. 6A and 6B are aberrational diagrams at a wide angle end and a telephoto end of the optical system according to the third embodiment.
Figure 6B:
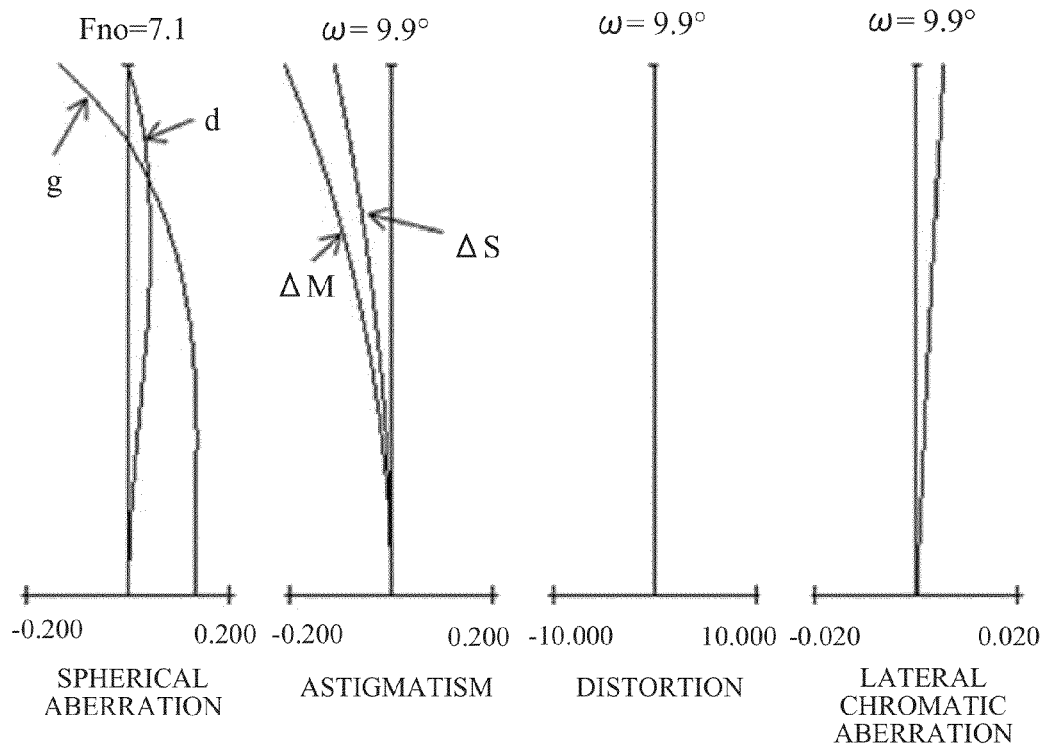
Figure 7:
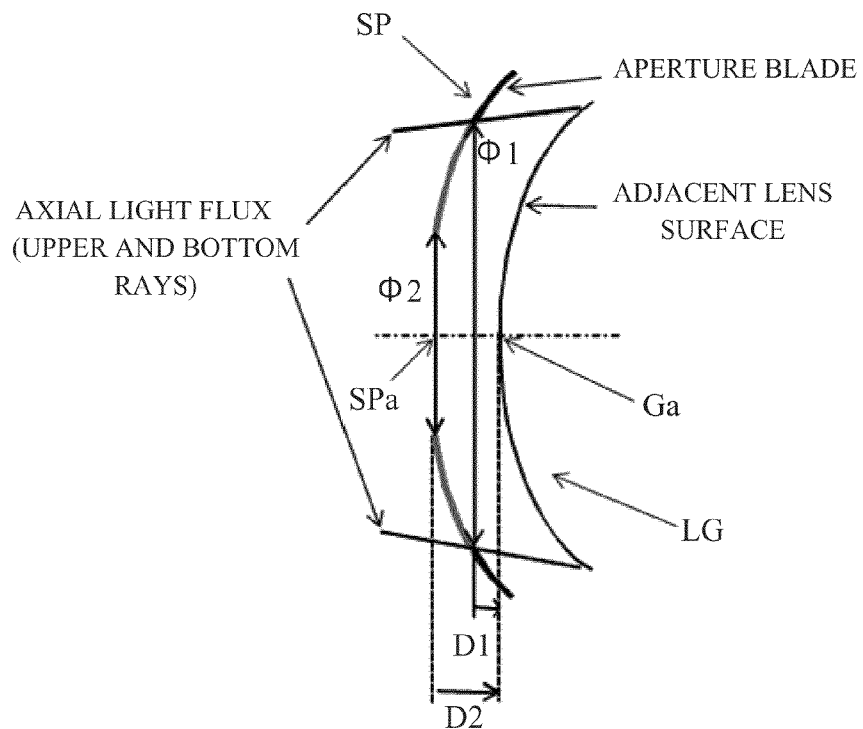
FIG. 7 is a view for explaining a principal part of an aperture diaphragm according to the present invention.
Figures 8A, 8B:
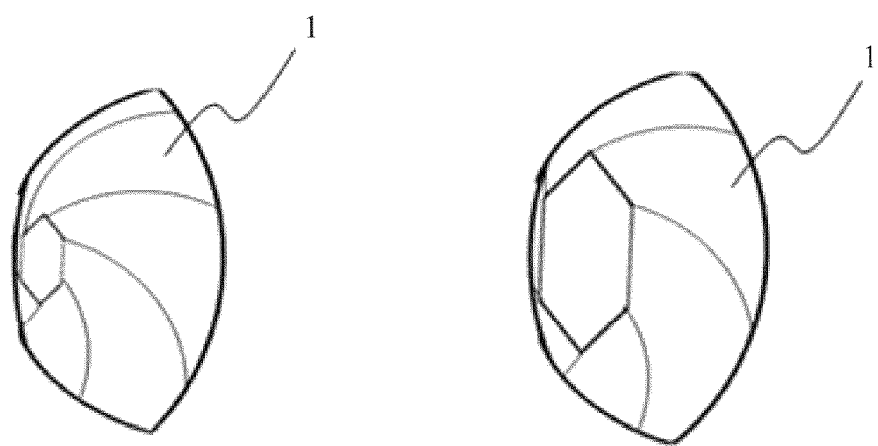
FIGS. 8A and 8B are perspective views of a principal part of the aperture diaphragm according to the present invention.

FIG. 3 is a lens sectional view at a wide angle end of a zoom lens according to a second embodiment of the present invention. FIGS. 4A and 4B are aberrational diagrams at a wide angle end and a telephoto end of the zoom lens according to the second embodiment, respectively. FIG. 5 is a lens sectional view at a wide angle end of a zoom lens according to a third embodiment of the present invention. FIGS. 6A and 6B are aberrational diagrams at a wide angle end and a telephoto end of the zoom lens according to the third embodiment, respectively. FIG. 7 is a sectional view of a principal part of an aperture diaphragm according to the present invention. FIGS. 8A and 8B are perspective views of a principal part of the aperture diaphragm according to the present invention.

Figure 9:
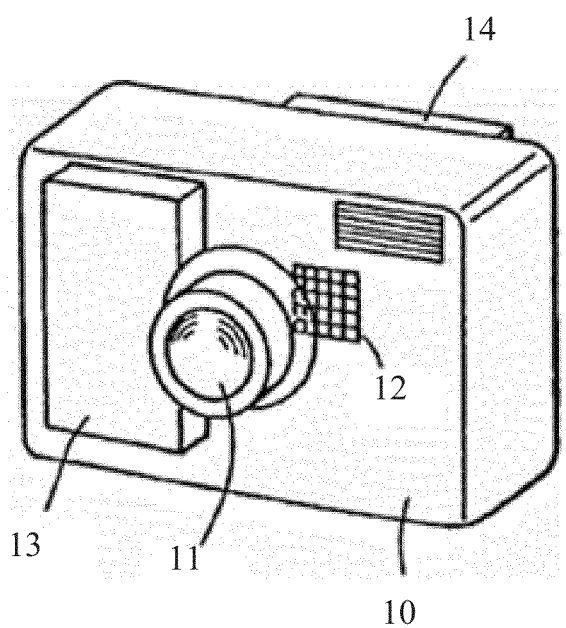
FIG. 9 is a schematic view of a principal part of an image pickup apparatus according to the present invention.

FIG. 9 is a perspective view of a principal part of the image pickup apparatus that includes the optical system according to the present invention.

The zoom lenses according to the first to third embodiments are image pickup optical systems used for the image pickup apparatus. A left side is an object side (front side), and a right side is an image side (backside) in the lens sectional view. In the first embodiment illustrated in FIG. 1, L1 denotes a first lens unit having a positive refractive power (optical power is a reciprocal of a focal length), L2 denotes a second lens unit having a negative refractive power, L3 denotes a third lens unit having a positive refractive power, and L4 denotes a fourth lens unit having a positive refractive power. SP denotes an F-number determining diaphragm (aperture diaphragm) configured to restrict a maximum aperture F-number light flux.

The aperture diaphragm SP is arranged on the object side of the third lens unit L3. FS denotes a flare cutting diaphragm having a constant aperture diameter. G denotes an optical block, such as an optical filter and a face plate. 1 mg denotes an image plane, corresponding to an image pickup plane of a solid state image sensor, such as a CCD sensor and a CMOS sensors (photoelectrical conversion element), when it is used as an image pickup optical system for a video camera and a digital camera. It corresponds to a film plane when it is used as an image pickup optical system for a film-based camera.

According to the first embodiment, each lens unit is moved as illustrated by arrows in zooming from the wide angle end to the telephoto end. More specifically, the first lens unit L1 moves to the object side after it moves to the image side. The second lens unit L2 moves to the object side with a concave locus. The third lens unit L3 moves to the object side together with the aperture diaphragm SP and the flare cutting diaphragm FP. The fourth lens unit L4 moves to the object side with a convex locus so as to correct an image plane fluctuation associated with the magnification variation. The fourth lens unit L4 is moved to the object side for focusing from an infinite object to a short distance object.

In the second embodiment illustrated in FIG. 3, L1 denotes a first lens unit having a negative refractive power, L2 denotes a second lens unit having a positive refractive power, and L3 is a third lens unit having a positive refractive power. SP denotes an aperture diaphragm arranged on the image side of the second lens unit L2. FS denotes a flare cutting diaphragm. The flare cutting diaphragm FS is arranged between a vertex on the object side of a positive lens that is closest to the object side in the second lens unit L2 in the optical axis direction and an intersection between the lens surface on the object side of the positive lens and the outer circumferential part (lens end surface). G denotes an optical block. Img denotes an image plane.

In the zoom lens according to the second embodiment, in zooming from the wide angle end to the telephoto end, the first lens unit L1 approximately reciprocates with a convex locus on the image side and corrects an image plane variation associated with the magnification variation. The second lens unit L2 monotonously moves to the object side for a main magnification variation. The aperture diaphragm SP and the flare cutting diaphragm FS move with the second lens unit L2. The third lens unit L3 moves to the image side.

In the zooming from the wide angle end to the telephoto end, an interval between the first lens unit L1 and the second lens unit L2 decreases, and an interval between the second lens unit L2 and the third lens unit L3 increases. The third lens unit L3 is moved to the object side for focusing from the infinite object to the short distance object.

The zoom type according to the third embodiment illustrated in FIG. 5 is the same as that of the second embodiment. The third embodiment is different from the second embodiment in that the aperture diaphragm SP is arranged between the first lens unit L1 and the second lens unit L2, and moves to the object side in zooming with a locus different from that of another lens unit. Another difference is that the flare cutting diaphragm FS is arranged on the image side of the second lens unit L2, and moves with the second lens unit L2 in zooming.

In the first and third embodiments, the synthesized refractive power of the lens units on the object side of the aperture diaphragm SP is negative, and the aperture diaphragm SP has a convex shape on the object side. In the second embodiment, the synthesized refractive power of the lens units on the object side of the aperture diaphragm is positive, and the aperture diaphragm SP has a convex shape on the image side. The aperture diaphragm SP having a shape determined by each embodiment provides a wide angle of field, a high zoom ratio, a compact overall system, and a high image quality.

In the first embodiment, the third lens unit L3 is partially or wholly moved with a component perpendicular to the optical axis for the image stabilization when an imaging position is moved perpendicular to the optical axis and the optical system oscillates. In the second and third embodiments, second lens unit L2 is partially or wholly moved with a component perpendicular to the optical axis so as to move the imaging position in the direction perpendicular to the optical axis.

In each embodiment, the lens unit closest to the image side is moved along the optical axis for focusing. This configuration restrains the weight of the lens unit that moves for focusing and realizes high-speed focusing.

In the aberrational diagrams, Fno denotes an F-number, and ω denotes half an angle of field (degree) of the image pickup angle of field. In the spherical aberration, d-line (solid line) and g-line (dotted line) are illustrated. In the astigmatism, a meridional image plane ΔM and a sagittal image plane ΔS for the d-line are illustrated. In the distortion, the d-line is illustrated. In the lateral chromatic aberration, the aberration of the g-line to the d-line is illustrated.

In each embodiment below, the wide angle end and the telephoto end represent an arrangement of each lens unit in a minimum focal length and an arrangement of each lens unit in a maximum focal length. An arrow indicates a locus of each lens unit in zooming from the wide angle end to the telephoto end, and a locus of each lens unit in focusing from the infinite objet to the short distance object.

Referring now to FIG. 7, a description will be given of a characteristic of the aperture diaphragm SP used for the optical system according to the present invention. A diaphragm distance represents a distance in the optical axis direction from an axial position Spa of the aperture part of the aperture diaphragm SP to a surface vertex Ga on the object side of a lens LG on the image side of the aperture diaphragm SP. Now assume that D1 denotes a diaphragm distance when the aperture diameter of the aperture diaphragm SP is Φ1, D2 denotes a diaphragm distance when the aperture diameter of the aperture diaphragm SP is Φ2, and fF denotes a synthesized focal length of the optical system arranged on the object side of the aperture diaphragm SP.

Then, the following conditional expression is satisfied where the synthesized focal length fF is a value at an arbitrary zoom position in the overall zoom range:

$$0.005 < fF^*(D1-D2)/|fF|^*(\Phi1-\Phi2) < 1.000 \tag{1}$$

In general, as the aperture diameter (diaphragm diameter) of the aperture diaphragm increases and an incident light amount of the axial light flux (axial light amount) increases, an image central part becomes bright and a periphery of an image becomes relatively darker. Accordingly, as illustrated in FIG. 7, as the aperture diameter of the aperture diaphragm SP increases, each embodiment moves the axial position (the position on the optical axis) of the aperture part of the aperture diaphragm SP to a divergence side of the axial light flux that passes the aperture diaphragm SP. Thereby, the aperture diameter becomes larger than that when the axial position of the aperture part of the aperture diaphragm SP does not change, and sufficiently large light amount at a periphery of an image can be secured.

On the other hand, when the aperture diameter of the aperture diaphragm decreases and an incident light amount of the axial light flux reduces, darkness at the periphery of an image is less likely to stand out. Accordingly, as shown in FIG. 7, as the aperture diameter of the aperture diaphragm SP decreases, each embodiment moves the axial position of the aperture part of the aperture diaphragm SP to a convergence side of the axial light flux that passes the aperture diaphragm SP. Thereby, the aperture diameter becomes smaller than that when the axial position of the aperture part of the aperture diaphragm SP does not change, a flare component of the off-axis light can be effectively prevented and the image quality can be improved.

This configuration can provide an optical system and an image pickup apparatus with a wide angle of view, a high zoom ratio, a compact overall system, and high image quality. In order to realize this configuration, the conditional expression (1) specifies a preferable ratio of a distances from the aperture diaphragm SP to the vertex Ga on the object side of the lens LG on the image side of the aperture diaphragm SP in a plurality of diaphragm diameters of the aperture diaphragm SP. It defines an axial moving direction of the aperture part when the aperture diameter of the aperture diaphragm SP is changed according to the refractive power of the optical system (whether the axial light flux incident upon the aperture diaphragm SP is a divergent light flux or a convergent light flux) arranged on the object side of the aperture diaphragm SP.

When the optical system placed on the object side of the aperture diaphragm SP has a negative refractive power (as in the first and third embodiments in FIGS. 1 and 5), the aperture diaphragm SP is arranged with its convex shape on the object side. On the other hand, when the optical system placed on the object side of the aperture diaphragm SP has a positive refractive power (as in the second embodiment in FIG. 3) the aperture diaphragm SP is arranged with its convex shape on the image side.

According to the first embodiment, the partial system that includes the first lens unit L1 and the second lens unit L2 has a negative refractive power in the overall zoom range, and the aperture blade of the aperture diaphragm SP has a convex shape on the object side. According to the second embodiment, the partial system that includes the first lens unit L1 and the second lens unit L2 has a positive refractive power in the overall zoom range, and the aperture blade of the aperture diaphragm SP has a convex shape on the image side. According to the third embodiment, the first lens unit L1 has a negative refractive power, and thus the aperture blade of the aperture diaphragm SP has a convex shape on the object side.

When a value is higher than the upper limit of the conditional expression (1) and the aperture diameter of the aperture diaphragm SP changes, the aperture position Ga of the aperture part of the aperture diaphragm SP changes in the optical axis direction excessively and an aperture diameter becomes excessively large so as to obtain an equivalent axial light amount. An unnecessary peripheral light flux passes the aperture diaphragm SP, and the flare disadvantageously deteriorates.

When a value is lower than the lower limit of the conditional expression (1) and the aperture diameter of the aperture diaphragm SP changes, a changing amount of the aperture position Ga of the aperture diaphragm SP in the optical axis direction becomes too small. As a result, when the aperture diameter is reduced, an unnecessary peripheral light flux cannot be effectively cut, and light amount at a periphery of an image disadvantageously reduces for the maximum aperture diameter in an attempt to effectively cut the unnecessary peripheral light flux when the aperture diameter is reduced.

The conditional expression (1) may be set as follows:

$$0.010 < fF^*(D1-D2)/|fF|^*(\Phi1-\Phi2) < 0.500 \tag{1a}$$

A description will now be given of conditions applicable to the zoom lens according to each embodiment of the present invention. In each embodiment, the aperture diaphragm SP may have an area in which a diaphragm distance D continuously changes when the aperture diameter Φ of the aperture diaphragm is continuously changed. Thereby, when the aperture diameter of the aperture diaphragm is set to the best aperture diameter Φ according to the situation of the object, such as the brightness and whether or not there is a motion, the diaphragm distance D of the aperture diaphragm can always be changed properly. Therefore, sufficiently large light amount at a periphery of an image can be secured and an unnecessary light flux can be cut.

When the aperture diameter Φ continuously changes in the motion image pickup, the light amount at a periphery of an image steeply changes unless the diaphragm distance D continues due to switching of the function of the aperture diaphragm to another material such as sheet metal, by the aperture diameter Φ. As a solution for this problem, by continuously changing the diaphragm distance D of the aperture diaphragm, light amount at a periphery of an image can be moderately changed and the brightness drop at a periphery of an image can be prevented from standing out.

A curved surface shape of the aperture blade is suitable for the shape of the aperture diaphragm according to this embodiment. This configuration can easily obtain an effect of each embodiment since the diaphragm distance of the aperture diaphragm can be more greatly changed for a large aperture diameter with which it is difficult to secure the light amount at a periphery of an image. The optical system retracts in the non-image pickup state, and the following conditional expression may be satisfied where Φoff denotes an aperture diameter of the aperture diaphragm SP in the retraction housing state and Φmin denotes a minimum value of an aperture diameter of the aperture diaphragm SP in the image pickup state:

$$\Phi min < \Phi off \tag{2}$$

In the retraction housing state, a lens unit interval can be as small as possible in the non-image pickup state and the housing performance can be enhanced. When the conditional expression (2) is satisfied, the aperture blade can be closer to the lens next to the diaphragm in the non-image pickup state than in the image pickup state. Hence, the miniaturization can be realized by narrowing the lens unit intervals in the retraction.

The optical system may satisfy the following conditional expression where Φmax is a maximum value of the aperture diameter of the aperture diaphragm SP in the image pickup state:

Φmax≤Φoff  (3)

The miniaturization can be realized by narrowing the lens unit intervals in the retraction because this configuration can arrange the aperture blade outside the lens diameter or the light effective diameter of the lens near the aperture diaphragm SP at the non-image pickup time. The optical system may have a zoom unit configured to provide zooming by moving two or more lens units. When the optical system moves two or more lens units for zooming, the diaphragm configuration can minimize the interval between the lens units, increase a moving amount of each lens unit and, easily provide a miniaturization and a high zoom ratio.

A description will now be given of the structure of the aperture diaphragm SP according to each embodiment. FIGS. 8A and 8B are schematic diagrams of a principal part of an iris diaphragm unit (aperture diaphragm unit) used for the optical system according to the present invention. FIG. 8A illustrates the aperture diaphragm having a small aperture diameter, and FIG. 8B illustrates the aperture diaphragm having a large aperture diameter. Reference numeral 1 denotes an aperture blade having a curved surface shape in FIGS. 8A and 8B, and an aperture diameter of the diaphragm and a position of the aperture diaphragm SP can be changed by rotating the aperture blade around the optical axis utilizing a motor (driver).

Referring now to FIG. 9, a description will be given of a digital still camera (image pickup apparatus) that utilizes one of the optical systems according to the first to third embodiments for the image pickup optical system. In FIG. 9, reference numeral 10 denotes a camera body. Reference numeral 11 denotes an image pickup optical system that includes one of the optical systems according to the first to third embodiments. Reference numeral 12 denotes a solid state image sensor (photoelectric conversion element), such as a CCD sensor and a CMOS sensor, configured to receive light of an object image formed by the image pickup optical system 11.

Reference numeral 13 is a recorder configured to record the object image received by the image pickup element 12. Reference numeral 14 denotes a viewfinder configured to observe the object image displayed on the display element (not illustrated). The display element includes a liquid display panel, etc., and to display the object image formed on the image pickup element 12.

A description will be given of numerical examples 1 to 3 corresponding to the first to third embodiments, respectively. In each numerical example, "i" denotes an order of a surface from the object side, "ri" denotes a radius of curvature of an i-th surface, "di" denotes an interval between the i-th surface and the (i+1)-th surface. "ndi" and "vdi" denote a refractive index and an Abbe number of a material of the i-th optical element of the d-line. In the numerical examples 1 to 3, two surfaces closest to the image side are planes corresponding to the optical block. An aspheric shape X is expressed by a displacement in the optical axis direction of the position having a height H from the optical axis. The light traveling direction is set to positive. R denotes a paraxial radius of curvature, k denotes a conic constant, A4, A6, A8, A10, A12, and A14 are aspheric coefficients, and the following expression is established:

$$X = \frac{H^2/R}{1+\sqrt{1-(1+k)(H/R)^2}} + A4H^4 + A6H^6 + A8H^8 + A10H^{10} + A12H^{12} + A14H^{14}$$

"*" denotes an aspheric surface. "e-x" denotes 10-x. "BF" denotes a back focus, and represents a distance from the final lens surface to the image plane by the air converted amount. In the second embodiment, an interval d5 is negative because it is counted in order from the object side to the image side as the flare cutting diaphragm FS, the second lens unit L2, and the lens G21 closest to the object side. Table 1 summarizes a relationship between each conditional expression and values of each numerical example:

NUMERICAL EXAMPLE 1

| Unit mm | | | | |
|---|---|---|---|---|
| Surface data | | | | |
| Surface No | r | d | nd | vd |
| 1 | 43.355 | 0.70 | 1.85478 | 24.8 |
| 2 | 27.876 | 2.80 | 1.49700 | 81.5 |
| 3 | 186.575 | 0.20 | | |
| 4 | 30.333 | 2.20 | 1.69680 | 55.5 |
| 5 | 124.611 | (variable) | | |
| 6 | 131.600 | 0.65 | 1.80400 | 46.6 |
| 7 | 6.543 | 3.75 | | |
| 8 | −17.777 | 0.50 | 1.69680 | 55.5 |
| 9 | 55.432 | 0.20 | | |
| 10 | 15.111 | 1.25 | 1.95906 | 17.5 |
| 11 | 45.565 | (variable) | | |
| 12(diaphragm) | 20.0 | 0.10 | | |
| 13* | 5.625 | 2.20 | 1.55332 | 71.7 |
| 14* | −25.277 | 0.62 | | |
| 15 | 14.271 | 0.70 | 1.80610 | 33.3 |
| 16 | 4.838 | 0.38 | | |
| 17 | 7.477 | 1.40 | 1.48749 | 70.2 |
| 18 | 17.169 | 0.90 | | |
| 19 | ∞ | (variable) | | (FS) |
| 20 | 18.330 | 1.85 | 1.77250 | 49.6 |
| 21 | −38.500 | 0.50 | 1.80518 | 25.4 |
| 22 | 107.333 | (variable) | | |
| 23 | ∞ | 1.00 | 1.51633 | 64.1 |
| 24 | ∞ | 1.00 | | |
| Image plane | ∞ | | | |

| Aspheric data | | |
|---|---|---|
| Thirteenth surface | | |
| K = −5.73745e−003 | A4 = −4.78728e−004 | A6 = −1.47023e−005 |
| A8 = 2.45877e−007 | A10 = −3.61188e−008 | |
| Fourteenth surface | | |
| K = −9.93400e+000 | A4 = 1.11861e−004 | A6 = −5.24268e−006 |

| Various data | | | | |
|---|---|---|---|---|
| Zoom ratio 17.90 | | | | |
| Focal length | 5.14 | 26.87 | 91.96 | 10.57 | 51.92 |
| Minimum Fno | 3.62 | 5.15 | 6.45 | 4.33 | 5.34 |
| Maximum Fno | 8.00 | 8.00 | 8.00 | 8.00 | 8.00 |
| Half angle of view (°) | 33.57 | 8.21 | 2.41 | 20.14 | 4.27 |
| image height | 3.41 | 3.88 | 3.88 | 3.88 | 3.88 |

-continued

| Unit mm | | | | | |
|---|---|---|---|---|---|
| Lens overall length | 57.49 | 65.81 | 82.18 | 56.66 | 75.98 |
| BF | 7.49 | 17.83 | 8.00 | 12.05 | 14.64 |
| fF | −10.45 | −21.70 | −68.26 | −12.71 | −43.08 |
| d5 | 0.70 | 18.67 | 30.05 | 6.87 | 26.95 |
| d11 | 22.85 | 4.65 | 0.10 | 11.51 | 2.47 |
| d19 | 5.55 | 3.76 | 23.13 | 5.33 | 11.02 |
| d22 | 5.83 | 16.17 | 6.34 | 10.39 | 12.98 | zoom lens unit data

| unit | starting surface | focal length |
|---|---|---|
| 1 | 1 | 46.36 |
| 2 | 6 | −7.81 |
| 3 | 12 | 14.43 |
| 4 | 20 | 29.20 |

Diaphragm data

| | Φmin | Φmax | Dmin | Dmax |
|---|---|---|---|---|
| Wide | 2.277 | 5.058 | 0.068 | −0.061 |
| Tele | 4.062 | 5.057 | −0.003 | −0.060 |

NUMERICAL EXAMPLE 2

| Unit mm | | | | |
|---|---|---|---|---|
| Surface Data | | | | |
| Surface No | r | d | nd | vd |
| 1* | 93.688 | 0.70 | 1.85135 | 40.1 |
| 2* | 4.961 | 1.67 | | |
| 3 | 8.301 | 1.75 | 1.94595 | 18.0 |
| 4 | 15.499 | (variable) | | |
| 5 | ∞ | −0.50 | | (FS) |
| 6* | 4.557 | 2.00 | 1.85135 | 40.1 |
| 7 | −50.164 | 0.50 | 1.80518 | 25.5 |
| 8 | 3.994 | 0.61 | | |
| 9* | 12.255 | 1.30 | 1.55332 | 71.7 |
| 10* | −10.916 | 0.45 | | |
| 11(diaphragm) | −30.00 | (variable) | | |
| 12* | 24.740 | 1.40 | 1.58313 | 59.4 |
| 13* | −34.752 | (variable) | | |
| 14 | ∞ | 1.00 | 1.51633 | 64.1 |
| 15 | ∞ | 1.00 | | |
| Image plane | ∞ | | | |

Aspheric data

First surface

K = 1.47969e+002    A4 = −1.15914e−004    A6 = 1.60396e−006
A8 = −5.35164e−009    A10 = −1.61954e−011    A12 = −1.91276e−012

Second surface

K = −1.01268e+000    A4 = 3.22680e−004    A6 = 5.11104e−006
A8 = −1.74608e−007    A10 = 1.20772e−008    A12 = −1.61077e−010
A14 = 2.49153e−013

Sixth surface

K = −5.36792e−001    A4 = 2.39786e−004    A6 = −6.81686e−006
A8 = 1.40839e−006

Ninth surface

K = −2.07615e+001    A4 = 4.20225e−004    A6 = 6.23762e−005
A8 = −1.04938e−005

Tenth surface

K = −3.05133e+000    A4 = −7.91903e−004    A6 = 8.24169e−005
A8 = −4.83374e−006

-continued

| Unit mm | | | |
|---|---|---|---|

Twelfth surface

K = −1.46886e+001    A4 = −5.69748e−005    A6 = 6.29327e−006
A8 = 4.51543e−007

Thirteenth surface

K = −2.31469e+002    A4 = −5.98676e−004    A6 = 2.77037e−005
A8 = 2.16784e−007

Various data
Zoom ratio 4.75

| | | | | | |
|---|---|---|---|---|---|
| Focal length | 4.40 | 12.55 | 20.90 | 16.70 | 8.45 |
| Minimum Fno | 2.88 | 5.14 | 6.08 | 5.65 | 4.24 |
| Maximum Fno | close | close | close | close | close |
| Half angle of View (°) | 37.78 | 17.16 | 10.50 | 13.06 | 24.64 |
| Image height | 3.41 | 3.88 | 3.88 | 3.88 | 3.88 |
| Lens overall length | 34.05 | 31.65 | 38.51 | 34.77 | 30.04 |
| BF | 4.51 | 4.27 | 4.03 | 4.15 | 4.39 |
| fF | 5.51 | 15.52 | 25.56 | 20.55 | 10.52 |
| d4 | 15.25 | 3.44 | 0.89 | 1.85 | 6.53 |
| d11 | 4.40 | 14.05 | 23.70 | 18.87 | 9.23 |
| d13 | 2.85 | 2.61 | 2.38 | 2.49 | 2.73 | zoom lens unit data

| unit | starting surface | focal length |
|---|---|---|
| 1 | 1 | −10.44 |
| 2 | 5 | 9.66 |
| 3 | 12 | 25.00 |

Diaphragm data

| | Φmin | Φmax | Dmin | Dmax |
|---|---|---|---|---|
| Wide | 0.000 | 3.120 | 4.400 | 4.441 |
| Tele | 0.000 | 4.006 | 23.700 | 23.767 |

NUMERICAL EXAMPLE 3

| Unit mm | | | | |
|---|---|---|---|---|
| Surface data | | | | |
| Surface No | r | d | nd | vd |
| 1* | −89882.247 | 1.10 | 1.84954 | 40.1 |
| 2* | 5.480 | 2.21 | | |
| 3 | 10.461 | 1.60 | 1.94595 | 18.0 |
| 4 | 21.049 | (variable) | | |
| 5(variable) | 5.00 | (variable) | | |
| 6* | 6.649 | 2.30 | 1.74330 | 49.3 |
| 7* | 195.770 | 0.17 | | |
| 8 | 5.668 | 1.65 | 1.51633 | 64.1 |
| 9 | 40.094 | 0.50 | 1.80518 | 25.4 |
| 10 | 3.904 | 2.64 | | |
| 11 | 12.109 | 1.40 | 1.72000 | 50.2 |
| 12 | 397.545 | 0.29 | | |
| 13 | ∞ | (variable) | | (FS) |
| 14 | 13.220 | 1.70 | 1.48749 | 70.2 |
| 15 | −333.999 | (variable) | | |
| 16 | ∞ | 1.00 | 1.51633 | 64.1 |
| 17 | ∞ | 1.00 | | |
| image plane | ∞ | | | |

-continued

Unit mm

Aspheric data

First surface

K = −7.54512e+008  A4 = −2.24468e−004  A6 = 6.41337e−006
A8 = −5.15297e−008  A10 = −2.13056e−010

Second surface

K = −2.26664e+000  A4 = 9.33605e−004  A6 = −2.01163e−005
A8 = 9.37294e−007  A10 = −1.63131e−008

Sixth surface

K = −1.20723e−001  A4 = −1.07870e−004  A6 = 1.70602e−006
A8 = 7.62863e−008  A10 = 1.71340e−008

Seventh surface

K = 2.32795e+003  A4 = 1.21576e−004  A6 = 2.00095e−006
A8 = 6.73308e−007  A10 = −1.26149e−008

Various data
Zoom ratio 4.94

| | | | | | |
|---|---|---|---|---|---|
| Focal length | 4.49 | 9.88 | 22.19 | 7.85 | 14.64 |
| Minimum Fno | 1.81 | 3.00 | 6.10 | 2.50 | 5.00 |
| Maximum Fno | 8.00 | 8.00 | 8.00 | 8.00 | 8.00 |
| Half angle of View (°) | 36.88 | 21.41 | 9.90 | 26.26 | 14.83 |
| Image height | 3.37 | 3.88 | 3.88 | 3.88 | 3.88 |
| Lens overall length | 40.07 | 35.37 | 45.16 | 35.31 | 38.14 |
| BF | 3.38 | 3.28 | 3.05 | 3.31 | 3.19 |
| fF | −10.50 | −10.50 | −10.50 | −10.50 | −10.50 |
| d4 | 13.30 | 6.18 | 0.81 | 7.34 | 4.65 |
| d5 | 4.50 | 0.23 | 0.33 | 1.52 | −1.33 |
| d13 | 3.34 | 10.13 | 25.41 | 7.58 | 16.07 |
| d15 | 1.72 | 1.62 | 1.39 | 1.66 | 1.53 |

Zoom lens unit data

| Unit | starting surface | focal length |
|---|---|---|
| 1 | 1 | −10.50 |
| 2 | 5 | ∞ |
| 3 | 6 | 10.82 |
| 4 | 14 | 26.13 |

Diaphragm data

| | Φmin | Φmax | Dmin | Dmax |
|---|---|---|---|---|
| Wide | 2.991 | 6.929 | 4.271 | 3.105 |
| Tele | 4.172 | 4.759 | −0.126 | −0.273 |

TABLE 1

| | Conditional expression | | First embod. | Second embod. | Third embod. |
|---|---|---|---|---|---|
| 1 | fF * (D1 · D2)/\|fF\| * (Φ1 − Φ2) | Wide | 0.046 | 0.013 | 0.296 |
| | | Tele | 0.057 | 0.017 | 0.250 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-108475, filed May 10, 2012 which is hereby incorporated by reference herein in its entirety.

What is claimed is:

1. An optical system comprising an aperture diaphragm having such a curved surface shape that an aperture part moves in an optical axis direction as an aperture diameter changes, wherein the aperture diaphragm has a convex shape on an object side when an optical system on the object side of the aperture diaphragm has a negative refractive power, and the aperture diaphragm has a convex shape on an image side when the optical system on the object side of the aperture diaphragm has a positive refractive power.

2. The optical system according to claim 1, wherein when it is assumed that a diaphragm distance is defined as a distance in an optical axis direction from an axial position of the aperture part of the aperture diaphragm to a vertex of a lens surface closest to the image side in an optical system arranged on the image side of the aperture diaphragm, and the following conditional expression is satisfied:

$$0.005 < fF^*(D1-D2)/|fF|^*(\Phi1-\Phi2) < 1.000$$

where D1 is the diaphragm distance when the aperture diameter of the aperture diaphragm is Φ1, D2 is the diaphragm distance when the aperture diameter of the aperture diaphragm is Φ2, and fF is a focal length of the optical system arranged on the object side of the aperture diaphragm.

3. The optical system according to claim 1, wherein the following conditional expression is satisfied:

$$\Phi min < \Phi off$$

where Φmin is a minimum value of the aperture diameter of the aperture diaphragm in an image pickup state, and Φoff is the aperture diameter of the aperture diaphragm in a retraction housing state.

4. The optical system according to claim 1, wherein the following conditional expression is satisfied:

$$\Phi max \leq \Phi off$$

where Φmax is a maximum value of the aperture diameter of the aperture diaphragm in an image pickup state, and Φoff is the aperture diameter of the aperture diaphragm in a retraction housing state.

5. The optical system according to claim 1, wherein the optical system is a zoom lens that includes, in order from the object side to the image side, a first lens unit having a positive refractive power, a second lens unit having a negative refractive power, the aperture diaphragm, a third lens unit having a positive refractive power, and a fourth lens unit having a positive refractive power, and intervals among the first to fourth lens units are configured to change in zooming, and wherein the optical system arranged on the object side of the aperture diaphragm has a negative refractive power in an overall zoom range, and the aperture diaphragm includes a plurality of aperture blades each forming the convex shape on the object side.

6. The optical system according to claim 1, wherein the optical system is a zoom lens that includes, in order from the object side to the image side, a first lens unit having a negative refractive power, a second lens unit having a positive refractive power, the aperture diaphragm, and a third lens unit having a positive refractive power, and intervals among the first to third lens units are configured to change in zooming, and wherein the optical system arranged on the object side of the aperture diaphragm has a positive refractive power in an overall zoom range, and the aperture diaphragm includes a plurality of aperture blades each forming the convex shape on the image side.

7. The optical system according to claim 1, wherein the optical system is a zoom lens that includes, in order from the object side to the image side, a first lens unit having a negative refractive power, the aperture diaphragm, a second lens unit having a positive refractive power, and a third lens unit having a positive refractive power, and intervals among the first to third lens units are configured to change in zooming, and wherein the aperture diaphragm includes a plurality of aperture blades each forming the convex shape on the object side.

8. An image pickup apparatus comprising an optical system, and an image pickup element configured to capture an image formed by the optical system, wherein the optical system comprises an aperture diaphragm having such a curved surface shape that an aperture part moves in an optical axis direction as an aperture diameter changes, wherein the aperture diaphragm has a convex shape on an object side when an optical system on the object side of the aperture diaphragm has a negative refractive power, and the aperture diaphragm has a convex shape on an image side when the optical system on the object side of the aperture diaphragm has a positive refractive power.

9. An optical system comprising an aperture diaphragm having such a curved surface shape that an aperture part moves in an optical axis direction as an aperture diameter changes, wherein the aperture diaphragm has a convex shape on an object side and an optical system on the object side of the aperture diaphragm has a negative refractive power.

10. An optical system comprising an aperture diaphragm having such a curved surface shape that an aperture part moves in an optical axis direction as an aperture diameter changes, wherein the aperture diaphragm has a convex shape on an image side and an optical system on an object side of the aperture diaphragm has a positive refractive power.

11. An image pickup apparatus comprising an optical system, and an image pickup element configured to capture an image formed by the optical system, wherein the optical system comprises an aperture diaphragm having such a curved surface shape that an aperture part moves in an optical axis direction as an aperture diameter changes, wherein the aperture diaphragm has a convex shape on an object side and an optical system on the object side of the aperture diaphragm has a negative refractive power.

12. An image pickup apparatus comprising an optical system, and an image pickup element configured to capture an image formed by the optical system, wherein the optical system comprises an aperture diaphragm having such a curved surface shape that an aperture part moves in an optical axis direction as an aperture diameter changes, wherein the aperture diaphragm has a convex shape on an image side and an optical system on an object side of the aperture diaphragm has a positive refractive power.

\* \* \* \* \*